US008660130B2

(12) United States Patent
Eldar

(10) Patent No.: US 8,660,130 B2
(45) Date of Patent: Feb. 25, 2014

(54) TRANSMITTING A PACKET

(75) Inventor: Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 12/987,908

(22) Filed: Jan. 10, 2011

(65) Prior Publication Data

US 2011/0134928 A1  Jun. 9, 2011

Related U.S. Application Data

(63) Continuation of application No. 10/968,712, filed on Oct. 18, 2004, now Pat. No. 7,877,519.

(51) Int. Cl.
*H04L 12/56* (2011.01)

(52) U.S. Cl.
USPC .......................................................... 370/400

(58) Field of Classification Search
USPC .......................................................... 370/400
See application file for complete search history.

(56) References Cited

U.S. PATENT DOCUMENTS

| | | | |
|---|---|---|---|
| 6,266,337 B1 * | 7/2001 | Marco | 370/410 |
| 6,885,677 B1 | 4/2005 | Klevans | |
| 7,506,074 B2 | 3/2009 | Venkatanarayan et al. | |
| 2003/0182291 A1 | 9/2003 | Kurupati et al. | |
| 2003/0195919 A1 * | 10/2003 | Watanuki et al. | 709/105 |
| 2005/0114549 A1 | 5/2005 | Durham et al. | |
| 2006/0083227 A1 | 4/2006 | Eldar | |
| 2008/0056494 A1 | 3/2008 | Jacobson et al. | |

OTHER PUBLICATIONS

Advisory Action for U.S. Appl. No. 10/968,712, dated Oct. 21, 2009, 4 pp.
Final Office Action 1 for U.S. Appl. No. 10/968,712, dated Jun. 10, 2009, 18 pp.
Final Office Action 2 for U.S. Appl. No. 10/968,712, dated Jun. 10, 2010, 16 pp.
Microsoft Corp., "Scalable Networking: Eliminating the Receive Processing Bottleneck—Introducing RSS", Windows Hardware and Driver Central, WinHEC 2004 Version, Apr. 14, 2004, 17 pp.
Notice of Allowance 1 for U.S. Appl. No. 10/968,712, dated Sep. 8, 2010, 19 pp.
Office Action 1 for U.S. Appl. No. 10/968,712, dated Dec. 23, 2008, 17 pp.
Office Action 3 for U.S. Appl. No. 10/968,712, dated Dec. 9, 2009, 19 pp.
Response to Final Office Action 1 for U.S. Appl. No. 10/968,712, dated Sep. 10, 2009, 14 pp.
Response to Final Office Action 1 for U.S. Appl. No. 10/968,712, dated Nov. 10, 2009, 17 pp.
Response to Final Office Action 2 for U.S. Appl. No. 10/968,712, dated Aug. 10, 2010, 16 pp.
Response to Office Action 1 for U.S. Appl. No. 10/968,712, dated Apr. 23, 2009, 15 pp.
Response to Office Action 3 for U.S. Appl. No. 10/968,712, dated Mar. 9, 2010, 18 pp.

* cited by examiner

*Primary Examiner* — Sulaiman Nooristany

(57) ABSTRACT

Provided are a method, system, and program for selecting one of a plurality of adapters to use to transmit a packet. A packet is generated by a protocol driver having connection information in a packet header. A determination is made as to whether there is one value in a table for the connection information. The packet and the determined value are forwarded to a network driver in response to determining that the table has one value for the connection information. The network driver uses the forwarded value to determine one of a plurality of adapters to use to transmit the packet over a network.

19 Claims, 4 Drawing Sheets

Packet

Control Information

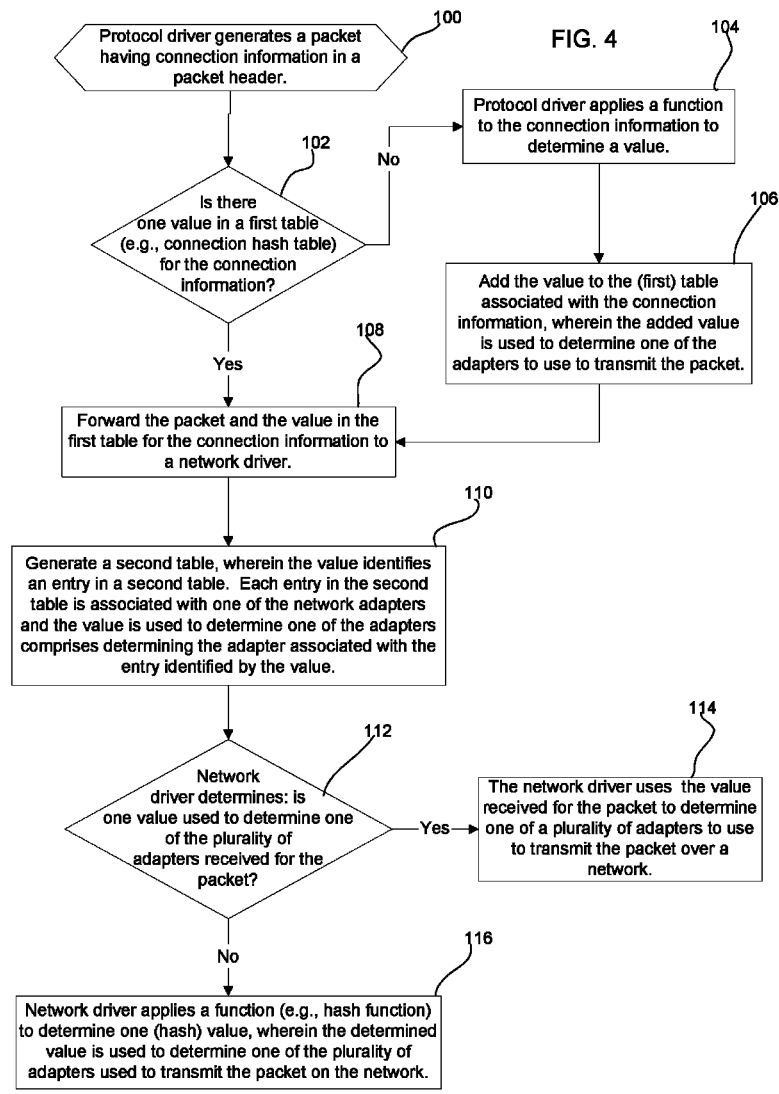

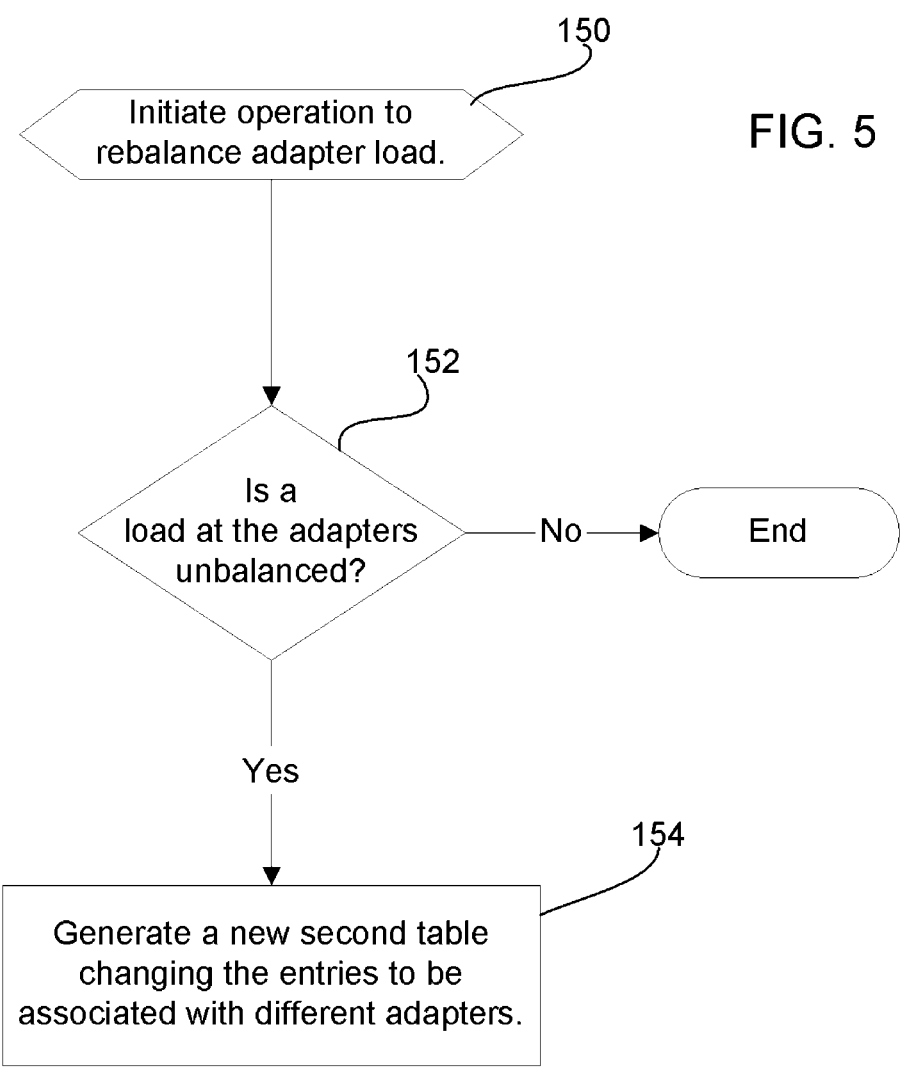

TRANSMITTING A PACKET

CROSS-REFERENCE TO RELATED APPLICATIONS

This application is a continuation of U.S. patent application Ser. No. 10/968,712, filed on Oct. 18, 2004, which application is incorporated herein by reference in its entirety.

BACKGROUND

A host computer may have multiple network cards to connect the system to a network. In current systems, the host may include a virtual network interface driver capable of teaming. A teaming program executes to interface between the host operating system and the network cards. For hosts including multiple adapters, the device driver would select one of the network cards to transmit a packet. The device driver executing in the host may execute a load balancing algorithm to select a particular network card to transmit the packet.

In certain systems, the virtual network interface may maintain a hash table having entries associated with different adapters. The virtual network interface applies a hash function to the connection information, such as the destination and source addresses and ports, in each outbound packet to produce a hash value that is associated with one entry in the hash table. The hash table entry is associated with an adapter. This technique ensures that packets for one connection always use the same adapter because the connection information provides the same hash value that maps to one hash table entry corresponding to an adapter to which the packet is forwarded for transmission. For instance, if the hash table has 256 entries, then these 256 entries can map to any of the available adapters. Multiple connections may hash to the same hash value and, thus, the same adapter.

BRIEF DESCRIPTION OF THE DRAWINGS

FIGS. 4 and 5 illustrate an embodiment of operations to select an adapter to use to transmit a packet.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
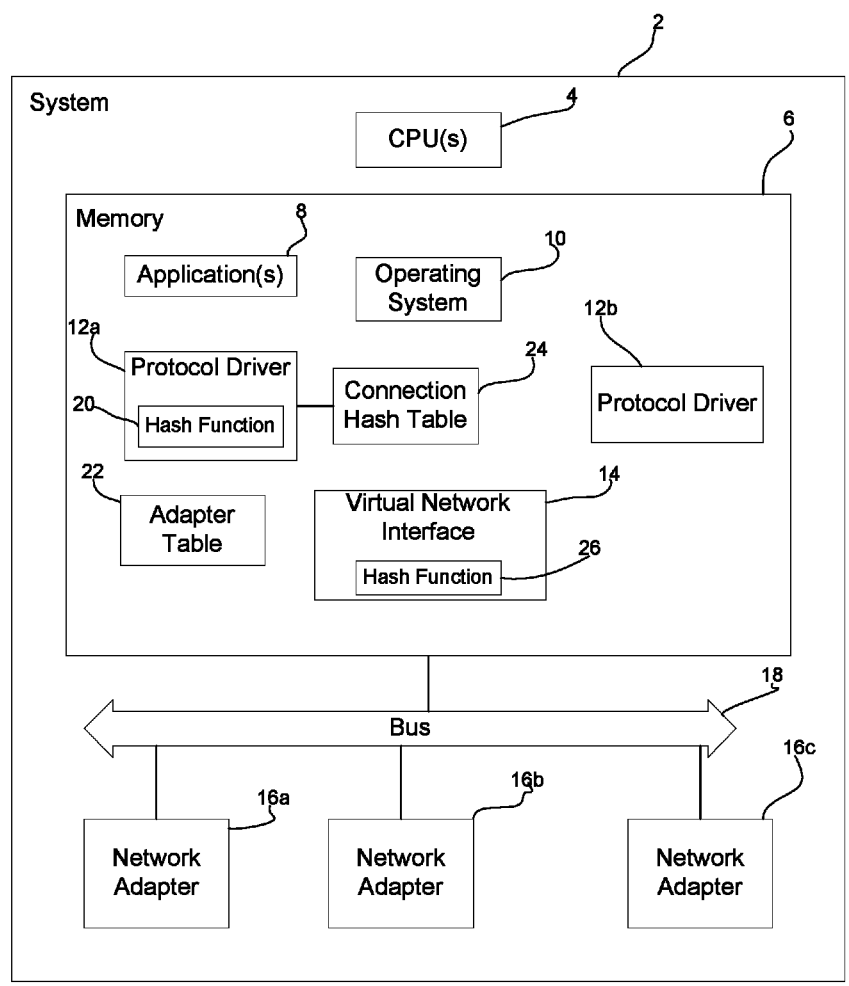
FIG. 1 illustrates a computing environment in which embodiments are implemented.

FIG. 1 illustrates a computing system 2 having at least one central processing unit (CPU) 4 and a memory 6, such as a volatile memory, in which programs execute. The CPU 4 executes in the memory 6 one or more application programs 8, an operating system 10, and one or more protocol drivers 12a, 12b (two are shown) that generate packets to transmit using different network transmission protocols, such as the Transmission Control Protocol (TCP)/Internet Protocol (IP), the Internet Packet Exchange (IPX) protocol, etc. Details of the TCP/IP protocol are discussed in the publication "A TCP/IP Tutorial", Network Working Group Request for Comments No. 1180 (1991) and the IPX protocol is described in the publication "Novell IPX Over Various WAN Media (IPX-WAN)", Network Working Group Request for Comments No. 1362 (1992). The protocol drivers 12a, 12b forward packets to a virtual network interface 14, also executing in memory 6, that selects one of a plurality of network adapters 16a, 16b, 16c to use to transmit a packet received from the protocol drivers 12a, 12b. The virtual network interface 14 transmits packets to the network adapters 16a, 16b, 16c over a bus 18.

In one embodiment, the protocol drivers 12a, 12b may perform many of the protocol and packet management operations. In an alternative embodiment, the protocol drivers 12a . . . 12b may comprise a TCP/IP Offload Engine (TOE) driver, where most of the packet management and protocol operations are performed in TOE circuitry in the adapters 16a, 16b . . . 16c and the protocol driver maintains connection state information and performs a more limited set of operations, including determining hash values as described below.

The adapters 16a, 16b, 16c may be mounted on the system 2 motherboard, such as a Local Area Network (LAN) on Motherboard implementation, or alternatively be implemented in an expansion card that is inserted in a slot on the system 2 motherboard. The bus 18 may comprise bus interfaces known in the art, such as the Peripheral Component Interconnect (PCI) bus described in the publication "Conventional PCI 2.3", published by the PCI-SIG.

One or more of the protocol drivers 12a, 12b may include a hash function 20 to generate a hash value from connection information in a packet identifying an entry in an adapter table 22 that is associated with one of the adapters 16a, 16b, 16c. The connection information to which the hash value applies may comprise some of the source and destination information in the packet generated by the protocol driver, such as the source address, destination address, source port, and/or destination port. Some protocol drivers, e.g., 12b, may not include a hash function 20. Protocol drivers 12a, 12b that include a hash function 20 may maintain a connection hash table 24 having entries that provide an association of connection information for packets and a hash value so that the hash value corresponding to a connection may be determined by looking up the value in the connection hash table 24. By looking-up the hash value in the connection hash table 24, the system avoids consuming computational resources to execute the hash function 20 to recalculate the hash value from the connection information.

The virtual network interface 14 may also include a hash function 26 to calculate the hash value from the connection information in a packet from protocol drivers, e.g., 12b, that do not include a hash function 20 and connection hash table 24 to determine the hash value for a connection. The hash function 26 may utilize the same algorithm as the hash function 20. Further, different hash operations may apply to the connection information for different protocol drivers.

Figure 2:
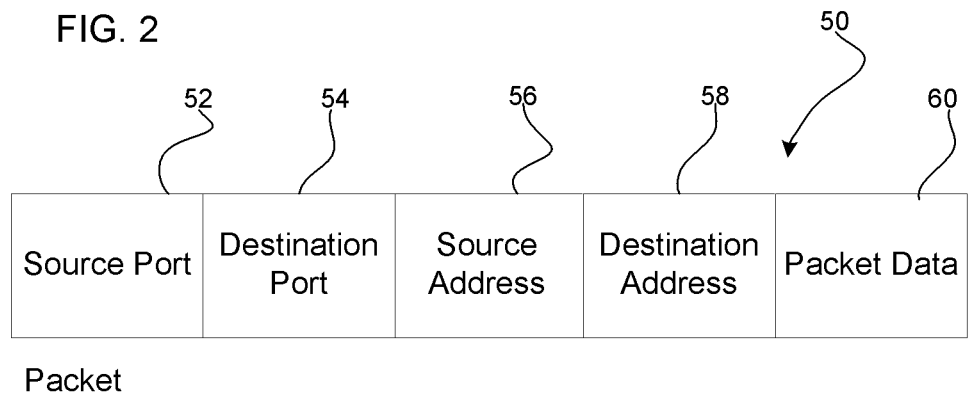
FIG. 2 illustrates an embodiment of fields in a packet.

FIG. 2 illustrates information maintained in a packet 50 generated by a protocol driver 12a, 12b, including a source port 52, a destination port 54, a source address 56, a destination address 58, and packet data 60. The fields 50-60 may be included in the packet header.

Figure 3:
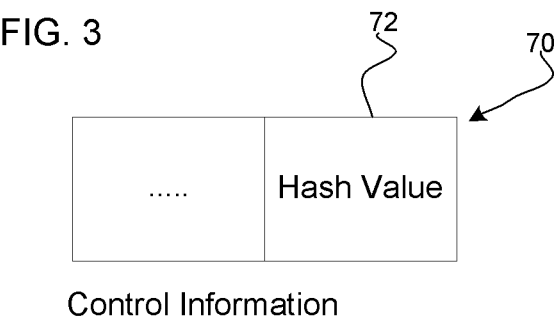
FIG. 3 illustrates an embodiment of control information sent with a packet.

FIG. 3 illustrates control information 70 the protocol driver 12a, 12b forwards to the virtual network interface 14. The protocol driver 12a, 12b may forward the control information 70 to the virtual network interface 14 directly or through a shared memory space. The control information 70 includes a hash value 72 calculated using the hash function 20 or from the connection hash table 24. The control information 70 may further include additional information for the packet, such as data memory pointers addressing the packets or other information. Protocol drivers 12a, 12b that do not include a hash function 20 or maintain a connection hash table 24 would not include a hash value 72 with their control information 70.

FIG. 4 illustrates operations performed by the protocol drivers 12a, 12b and virtual network interface 14 to forward packets to an adapter 16a, 16b, 16c to transmit over the network. The protocol driver 12a, 12b generates (at block 100) a packet having connection information in a packet header, which may comprise the source 52 and destination 54 ports and source 56 and destination 58 addresses. If (at block 102) there is not one value in a first table (e.g., connection hash table 24) for the connection information, then the protocol driver 12a, 12b applies (at block 104) a function to the connection information to determine a value. The function may comprise the hash function 20 to produce a hash value that directly or through further processing identifies one entry in the adapter table 22 that is associated with one adapter 16a, 16b, 16c. The determined hash value is added (at block 106) to the table, e.g., connection hash table 24, and associated with the connection information. The added value is used to determine one of the adapters to use to transmit the packet.

If (at block 102) there is one value, e.g., hash value, for the connection information in the table 24, then the protocol driver 12a, 12b forwards (at block 108) the packet and the value in the connection hash table 24 for the connection information to a network driver, such as the virtual network interface 14. The protocol driver 12a, 12b may include the value in the control information 70, such as in the hash value field 72 (FIG. 3) of the control information 70 sent with the packet 50. At some point, a second table (e.g., the adapter table 22) is generated (at block 110). The adapter table 22 may be generated and maintained by the virtual network interface 14. The value 72 sent with the control information 70 for the packet 50 identifies an entry in the second table 22. Each entry in the second table (adapter table 22) is associated with one of the network adapters 16a, 16b, 16c. Using the value to determine one of the adapters may comprise determining the adapter 16a, 16b, 16c associated with the entry in the second table 22 identified by the value.

The network driver, e.g., virtual network interface 14, determines (at block 112) whether the value used to determine one of the plurality of adapters is received for the packet. The value 72 may be received with control information 70 sent by the protocol driver 12a, 12b for the packet 50. If so, the network driver 14 uses (at block 114) the value received for the packet 50 to determine one of a plurality of adapters 16a, 16b, 16c to use to transmit the packet over a network. Otherwise, if a hash value 72 is not received for the packet 50, then the network driver 14 applies (at block 116) a function (e.g., hash function 26) to determine one (hash) value. In one embodiment, the protocol driver, e.g., 12b, may not include a hash function 20 to generate a hash value to include with the control information 70 for the packet 50. In such case, the virtual network interface 14 applies the hash function 26 to determine the hash value that identifies an entry in the adapter table 22 associated with an adapter 16a, 16b, 16c.

FIG. 5 illustrates operations performed by the virtual network interface 14 to modify the assignment of the adapters to the entries in the adapter table 22 to perform load balancing for the adapters. Upon initiating (at block 150) an operation to rebalance the adapter load, the virtual network interface 14 determines if the packet processing load at the adapters 16a, 16b, 16c is unbalanced, i.e., the load at one adapter exceeds the load at the other adapters by a certain threshold. If the load is not unbalanced, control ends. Otherwise, if the load is unbalanced, then the virtual network interface 14 generates (at block 154) a new second table 22 changing the assignment of entries to the adapters 16a, 16b, 16c. By changing the entries that the adapters are associated with, the hash values will then select different adapters, thereby changing the adapter load.

In one embodiment, the hash function 20 processes information in the packet header to produce a signature for the packet that is used as an index into the adapter table 22, where the protocol driver 12a, 12b or virtual network interface 14 may change the assignment of adapters 16a, 16b, 16c to entries in the table 22 to dynamically balance the packet load at the adapters. The hash function may comprise a Toeplitz hash or Level 4 hash that is applied to certain of the information in the packet header, such as the source and/or destination addresses and source and/or destination ports, i.e., a four tuple, or to just the source and destination addresses. In one embodiment, a subset of the hash result bits are used to provide an index into the adapter table 22. A mask may be applied to the hash result to determine those bits indicating the index (i.e., entry in the adapter table 22), where the maximum possible value of the masked hash result indicates the number of entries in the adapter table 22.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

The illustrated operations of FIGS. 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
  accessing a hash value of a Toeplitz hash of a source Internet Protocol address, a destination Internet Protocol address, a source port, and a destination port;
  storing, prior to sending to a network driver associated with at least one network adapter, the hash value in control information associated with a packet to be transmitted to a remote destination via the at least one network adapter, the hash value being maskable by an associated mask to indicate a set of hash bits to obtain an index into a table, a maximum possible value of a such masked hash value corresponding to a number of entries in the table; and
  sending the packet and the control information associated with the packet to the network driver associated with the at least one network adapter for transmission of the packet to the remote destination,
  wherein the control information further comprises a memory pointer addressing the packet;
  wherein the accessing, storing, and sending comprise accessing, storing, and sending by a protocol driver;
  wherein the protocol driver comprises a Transmission Control Protocol/Internet Protocol (TCP/IP) protocol driver; and
  wherein the packet comprises a packet having a Transmission Control Protocol header and an Internet Protocol header.

2. The method of claim 1, further comprising:
  wherein the at least one network adapter comprises multiple network adapters; and
  determining a one of the multiple network adapters based on the determined hash value.

3. The method of claim 1,
  wherein the network driver comprises a virtual network interface.

4. The method of claim 1,
  wherein the Internet Protocol address, the destination Internet Protocol address, the source port, and the destination port comprise the Internet Protocol address, the destination Internet Protocol address, the source port, and the destination port of the packet to be transmitted.

5. A method, comprising:
  by a network driver, receiving control information associated with a packet, the packet from a TCP/IP (Transmission Control Protocol/Internet Protocol) protocol driver and to be transmitted to a remote destination via a network adapter, the control information comprising a field for a hash value for the packet, the hash value of a Toeplitz hash of a source Internet Protocol address, a Internet Protocol destination address, a source port, and a destination port, the hash value being maskable by an associated mask to indicate a set of hash bits to obtain an index into a table, a maximum possible value of a such masked hash value corresponding to a number of entries in the table;
  by the network driver, receiving the packet to be transmitted to the remote destination via the network adapter; and
  by the network driver, causing transmission of the packet via the network adapter to the remote destination,
  wherein the control information further comprises a memory pointer addressing the packet; and
  wherein the packet comprises a packet having a Transmission Control Protocol header and an Internet Protocol header.

6. The method of claim 5, further comprising:
  determining the network adapter from multiple network adapters based on the determined hash value.

7. The method of claim 5, further comprising:
  storing the determined hash value in the hash value field of the control information associated with the packet; and
  sending the packet and the control information associated with the packet comprising the determined hash value to the network driver associated with at least one network adapter.

8. The method of claim 5,
  wherein the network driver comprises a virtual network interface.

9. The method of claim 5, wherein the Internet Protocol address, the destination Internet Protocol address, the source port, and the destination port comprise the Internet Protocol address, the destination Internet Protocol address, the source port, and the destination port of the packet to be transmitted.

10. A non-transitory computer readable storage medium comprising at least one computer program having instructions for causing a processor to:
  access a hash value of a Toeplitz hash of a source Internet Protocol address, a destination Internet Protocol address, a source port, and a destination port;
  store, prior to transmission to a network driver associated with at least one network adapter, the hash value in control information associated with a packet to be transmitted to a remote destination via the at least one network adapter, the hash value being maskable by an associated mask to indicate a set of hash bits to obtain an index into a table, a maximum possible value of a such masked hash value corresponding to a number of entries in the table; and
  send the packet and the control information associated with the packet to the network driver associated with the at least one network adapter for transmission of the packet to the remote destination,
  wherein the control information further comprises a memory pointer addressing the packet;
  wherein the instructions to access, store, and send comprise instructions of a protocol driver; wherein the protocol driver comprises a Transmission Control Protocol/Internet Protocol (TCP/IP) protocol driver; and
  wherein the packet comprises a packet having a Transmission Control Protocol header and an Internet Protocol header.

11. The at least one computer program of claim 10,
  wherein the network driver comprises a virtual network interface.

12. The at least one computer program of claim 10,
  wherein the Internet Protocol address, the destination Internet Protocol address, the source port, and the destination port comprise the Internet Protocol address, the destination Internet Protocol address, the source port, and the destination port of the packet to be transmitted.

13. At least one computer program, disposed on at least one non-transitory computer readable medium, the at least one computer program comprising network driver instructions for causing at least one processor to:

by the network driver, receiving control information associated with a packet, the packet from a TCP/IP (Transmission Control Protocol/Internet Protocol) protocol driver and to be transmitted to a remote destination via a network adapter, the control information comprising a hash value of a Toeplitz hash of a source Internet Protocol address, a destination Internet Protocol address, a source port, and a destination port, the hash value being maskable by an associated mask to indicate a set hash bits to obtain an index into a table, a maximum possible value of a such masked hash value corresponding to a number of entries in the table;

by the network driver, receiving the packet; and by the network driver, causing transmission of the packet via the network adapter to the remote destination, wherein the control information further comprises a memory pointer addressing the packet;

wherein the packet comprises a packet having a Transmission Control Protocol header and an Internet Protocol header.

14. The at least one computer program of claim 13, further comprising:

storing the determined hash value in the control information associated with the packet; and sending the packet and the control information associated with the packet comprising the determined hash value to the network driver associated with at least one network adapter.

15. The at least one computer program of claim 13, wherein the network driver comprises a virtual network interface.

16. The at least one computer program of claim 13, wherein the Internet Protocol address, the destination Internet Protocol address, the source port, and the destination port comprise the Internet Protocol address, the destination Internet Protocol address, the source port, and the destination port of the packet to be transmitted.

17. A system, comprising:

at least one processor;

at least one network adapter;

and at least one computer program, disposed on at least one non-transitory computer readable storage medium, the at least one computer program comprising network driver instructions and TCP/IP (Transmission Control Protocol/Internet Protocol) protocol driver instructions for causing the at least one processor to:

by the protocol driver:

generate packets for transmission and to maintain connection state for connections;

access a hash value of a Toeplitz hash of a source Internet Protocol address, a destination Internet Protocol address, a Transmission Control Protocol source port, and a Transmission Control Protocol destination port, the hash value being maskable by an associated mask to indicate a set hash bits to obtain an index into a table, a maximum possible value of a such masked hash value corresponding to a number of entries in the table;

store the accessed hash value in control information associated with the packets; and send the packets and the control information associated with the packets comprising the hash value to the network driver associated with at least one network adapter;

by the network driver:

receive the control information associated with the packets to be transmitted to a remote destination via a network adapter, receive the packets; and cause transmission of the packets via a network adapter to the remote destination, wherein the control information further comprises a memory pointer addressing the packets;

wherein the packets comprises packets having a Transmission Control Protocol header and an Internet Protocol header.

18. The system of claim 17, further comprising instructions to select one of multiple network adapters to transmit the packets based on the determined hash value.

19. The system of claim 17, wherein the Internet Protocol address, the destination Internet Protocol address, the source port, and the destination port comprise the Internet Protocol address, the destination Internet Protocol address, the source port, and the destination port of the packets to be transmitted.

* * * * *